UNITED STATES PATENT OFFICE.

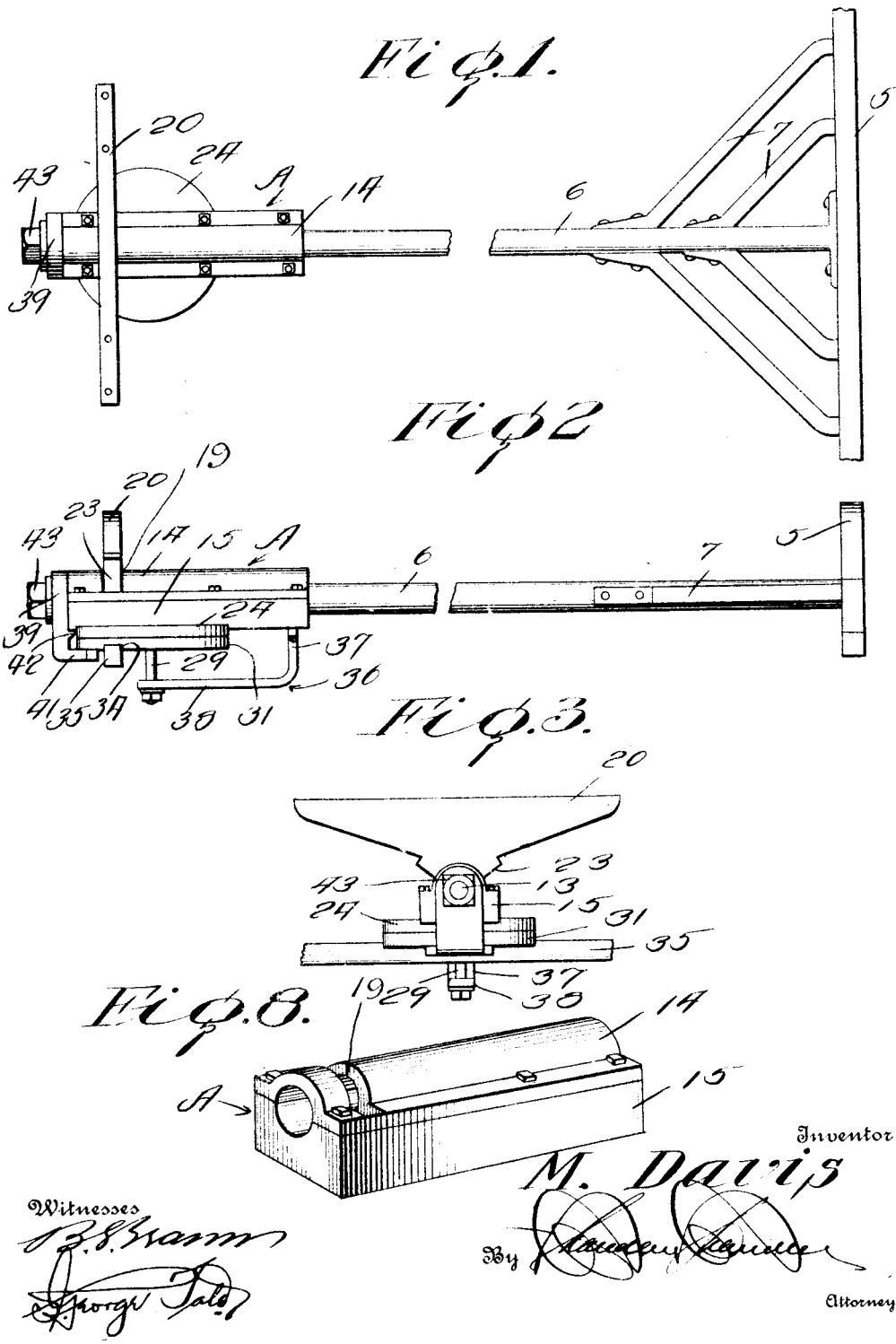

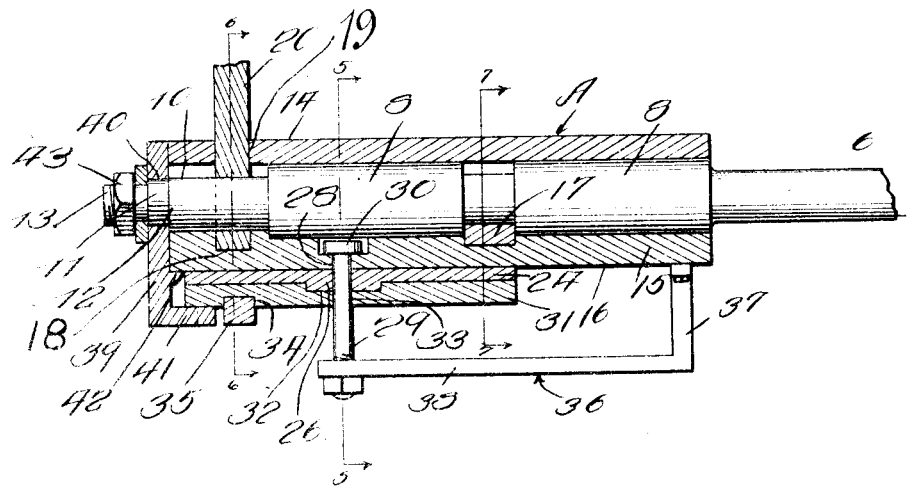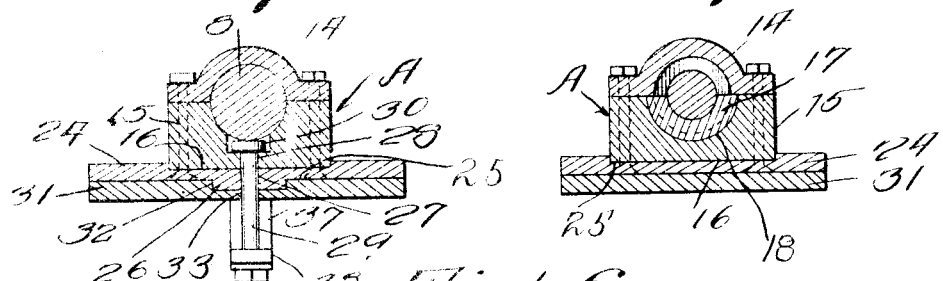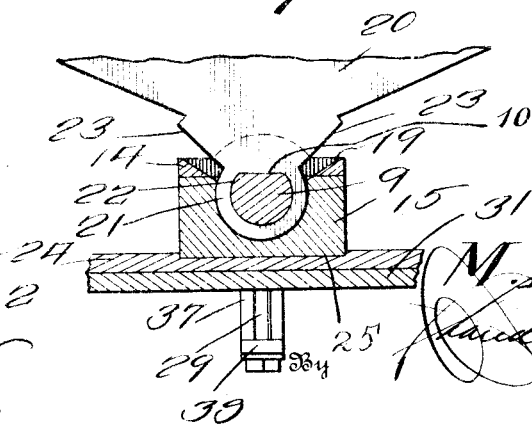

MILO DAVIS, OF DEDERICK, MISSOURI.

FIFTH-WHEEL CONNECTION FOR VEHICLES.

1,079,475.

Specification of Letters Patent.   Patented Nov. 25, 1913.

Application filed November 14, 1912.   Serial No. 731,394.

*To all whom it may concern:*

Be it known that I, MILO DAVIS, a citizen of the United States, residing at Dederick, in the county of Vernon, State of Missouri, have invented certain new and useful Improvements in Fifth-Wheel Connections for Vehicles; and I do hereby declare the following to be a full, clear, and exact description of the invention, such as will enable others skilled in the art to which it appertains to make and use the same.

This invention relates to new and useful improvements in fifth wheel connections for vehicles.

The principal object of the invention is to provide a connection between the reach bar and the front axle of a vehicle for permitting either of the front wheels to pass over any obstructions without straining the reach bar and at the same time permitting the front axle to be freely turned.

Another object of the invention is to provide a fifth wheel connection for the purpose described which will permit of the front axle to be readily removed from the fifth wheel, and the fifth wheel readily removed from the reach bar.

A further object of the invention is to provide a fifth wheel connection for vehicles which is composed of a minimum number of parts, is therefore simple in construction, is durable in use, will not rattle and is cheap to manufacture.

With these and other objects in view, the invention consists in the construction and novel combination of parts hereinafter fully described, illustrated in the accompanying drawings and pointed out in the claim hereto appended; it being understood that various changes in the form, proportion, size and minor details of construction within the scope of the claim may be resorted to without departing from the spirit or sacrificing any of the advantages of the invention.

In the drawings: Figure 1 is a top plan view of a running gear equipped with a fifth wheel connection constructed in accordance with my invention, Fig. 2 is a side elevation thereof, Fig. 3 is a front end elevation, Fig. 4 is a detail longitudinal sectional view through the connection, Fig. 5 is a cross sectional view taken on the line 5—5 of Fig. 4, parts thereof being shown in elevation, Fig. 6 is a detail cross sectional view taken on the line 6—6 of Fig. 4, Fig. 7 is a detail cross sectional view taken on the line 7—7 of Fig. 4, and Fig. 8 is a perspective view of the front bearing for the fifth wheel.

Like reference numerals designate corresponding parts in all the figures of the drawings.

Referring to the drawings, 5 designates a rear axle and from this axle extends the reach bar 6, the latter being secured to the axle by means of braces 7. The reach bar 6 is formed from a single length of cylindrical metal and formed in the bar adjacent the forward end thereof are spaced enlargements 8—8 forming consequent bearings. Beyond the front bearing the bar 6 is reduced, as at 9, and has a flat upper face 10. The portion 9 terminates at its forward end in a further reduced stem 11 forming a consequent transverse shoulder 12, and the stem 11 terminates at its forward end in a threaded end 13.

Disposed around the forward end of the reach bar 6 is a boxing A which consists of upper and lower sections 14 and 15 respectively, the latter being formed with a flat underface 16 and these sections are detachably connected by means of bolts. The sections 14 and 15 are conjointly bored to fit the bearings 8—8, and inset in the inner face of the lower section 15 is a transversely disposed semi-circular rib 17 which fits between the bearings 8—8 and serves to hold the boxing A against longitudinal movement with respect to the reach bar 6.

The boxing A extends from the rear end of the rear bearing 8 to the shoulder 12, and formed in the inner face of the lower section 15 in alinement with the portion 9 is a transverse groove 18 forming a seat. Formed through the upper section 14 in alinement with the groove 18 is an outwardly flared opening 19. A bolster 20 is centrally formed with a depending eye member 21, the opening 22 thereof conforming to the shape of the portion 9. The eye member 21 of the bolster receives the portion 9 of the reach bar 6 therethrough and has its lower portion seated within the groove 18 of the lower section 15, and extends upwardly through the opening 19 of the upper section 14. The eye member 21 is formed with spaced upwardly and outwardly inclined shoulders 23—23 which are normally spaced equal distances from the upper sections 14 of the boxing A. It will thus be observed that the bolster 20 through the medium of the flat face 10 of the portion 9 and the consequent shape of the eye 21, will be prevented from independent lateral swinging movement with respect to the reach bar 6. This construction, however, permits the boxing A to oscillate in either direction around the reach bar 6 for a limited distance or until the boxing contacts with either of the shoulders 23.

Disposed below the forward end of the boxing A is a circular bearing plate 24. The upper face of this plate is formed with a transverse seat 25 for receiving the lower section 15 of said boxing. The lower face of the plate is concentrically formed with a depending bearing 26 having an opening 27 formed therein which registers with an opening 28 formed in the lower section 15 of the boxing. A king bolt 29 is disposed in the openings 27 and 28, and has its head 30 countersunk in the lower section 15.

Disposed directly below the bearing plate 24 is a fifth wheel 31, and this fifth wheel has its upper face formed with a socket 32 for receiving the bearing 26 of the plate 24, the wheel being concentrically formed with an opening 33 for receiving the king bolt 29. Formed in the inner face of the fifth wheel 31 in rear of the opening 33 is a groove 34 which constitutes a seat and receives the front axle 35, said axle being secured to the fifth wheel by means of bolts or the like. In order to hold the king bolt 29 against any possible strain, there is provided an L-shaped bracket 36, the short arm 37 thereof being suitably secured to the rear end of the lower section 15 of the boxing A. The forward end of the long arm 38 of said bracket is formed with a suitable opening for receiving the king bolt 29.

My invention further comprises a front bearing and supporting bracket 39. This bracket is formed from a single flat casting, and formed in the upper end thereof is an opening 40 for receiving the portion 11 of the reach bar 6, said bracket 39 being disposed against the shoulder 12 of said reach bar. The bracket 39 extends downwardly and is formed with a rearwardly extending foot 41 which is disposed below the fifth wheel 31 and serves to hold said wheel against rattling. In order to prevent swinging movements of the bracket 39, said bracket is formed with a pair of spaced rearwardly extending legs 42—42 which engage under the lower sections 15 of the boxing A. In order to secure the bracket 39 against accidental displacement, there is provided a nut 43 which is engaged with the threaded end 13 of the reach bar.

In practice, it will be observed that when either end of the front axle 35 moves up or down, the fifth wheel 31, bearing plate 24 and boxing A will be correspondingly moved for such a distance until the boxing engages either of the shoulders 23, as above described. By this means the front axle 35 can swing vertically and can also be swung horizontally without imparting any strain whatsoever to the reach bar 6.

What is claimed is:

In a fifth wheel connection for vehicles, a boxing consisting of detachable upper and lower sections rotatably mounted on the reach and having interlocking connection therewith, the upper section being formed with an opening, a bolster having an eye depending therefrom extending through the opening of the boxing and receiving the end of the reach bar therethrough, an upper bearing plate carried by the lower section of the boxing, a fifth wheel disposed below and bearing thereagainst, a king-bolt carried by the lower section extending through the plate and wheel, and said reach bar journaled in the boxing and having enlarged bearing portions and reduced portions, a transverse key carried by the boxing and disposed between the enlarged bearings, and a bracket carried by the front end of the reach bar, and having means engaging under the fifth wheel and boxing to support the wheel and boxing against rattling.

In testimony whereof, I affix my signature, in the presence of two witnesses.

MILO DAVIS.

Witnesses:
 Geo. F. McKim,
 W. F. Young.